Patented June 30, 1931

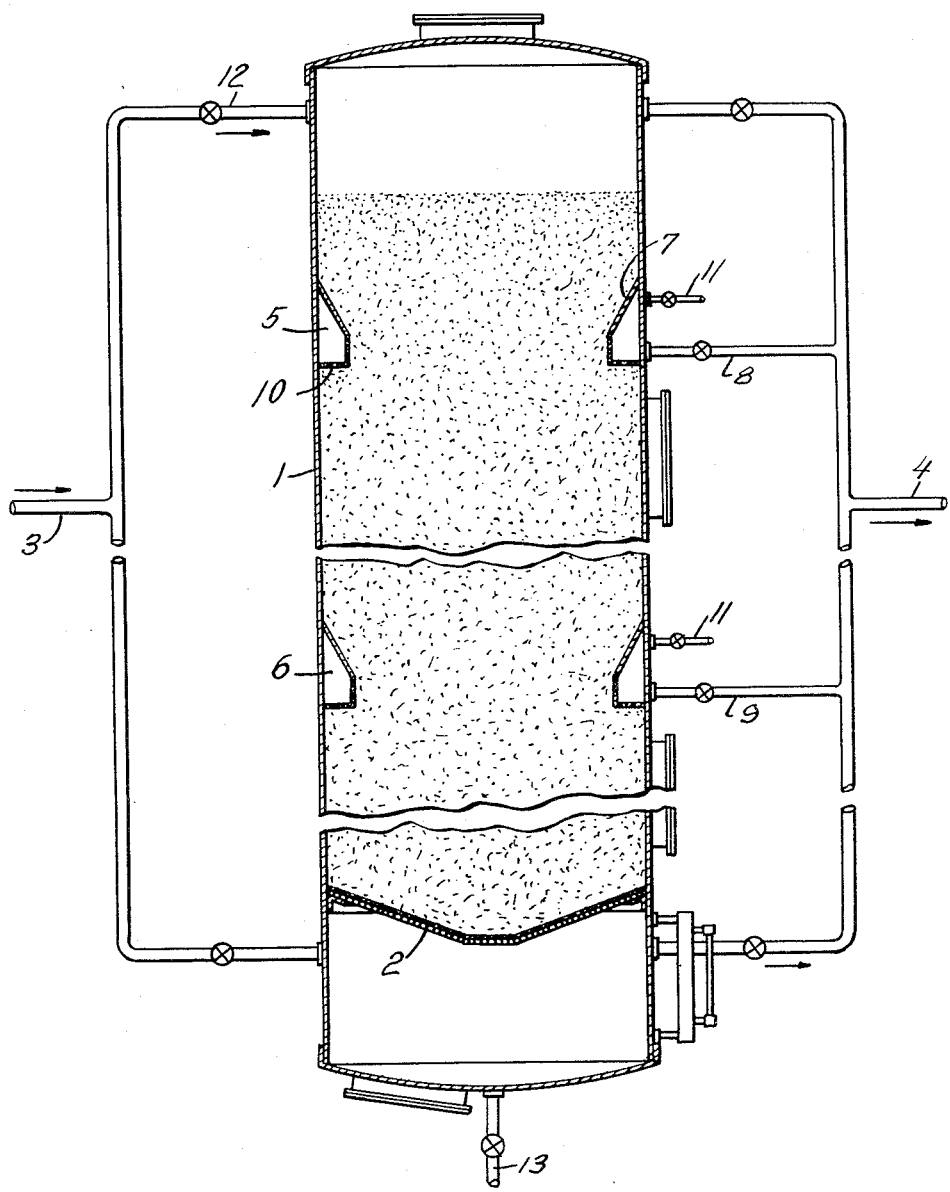

1,812,446

UNITED STATES PATENT OFFICE

WILLIAM MENDIUS, OF CHICAGO, ILLINOIS, ASSIGNOR TO SINCLAIR REFINING COMPANY, OF NEW YORK, N. Y., A CORPORATION OF MAINE

ART OF REFINING HYDROCARBONS

Application filed February 10, 1928. Serial No. 253,372.

This invention relates to improvements in the vapor phase refining of hydrocarbons and hydrocarbon mixtures; and more particularly relates to improvements in apparatus for refining operations in which hydrocarbon vapors are passed in contact with an adsorptive catalyst such as fuller's earth to separate, by adsorption or polymerization or otherwise, constituents not suitable as components of the refined product.

When hydrocarbon vapors including certain types of unsaturated compounds, for example the di-olefines, are passed in contact with fuller's earth or similar adsorptive catalysts, a polymerization of these unsaturated compounds takes place with resulting formation of polymers of boiling point higher than that of the original compound. This makes possible a separation of such constituents, undesirable as components of the refined product without separation of other unsaturated constituents suitable as components of such products, and the several advantages of this general method of refining the hydrocarbon vapors have made it of considerable practical importance, in the refining of motor fuel gasoline in particular. As applied to gasoline, this general method makes possible the removal of constituents rendering the product unstable, of bad color or bad odor without removal of unsaturated constituents of special value in the product, such as those which have anti-knock properties.

As commonly practiced, this general method has involved charging of a suitable receptacle with a batch of the adsorptive catalyst, passing the hydrocarbon vapors through this receptacle in contact with the adsorptive catalyst until the catalyst has lost its effectiveness, discharging the spent adsorptive catalyst, replacing the discharged material with a fresh charge of the adsorptive catalyst, and so on. The adsorptive catalyst as initially supplied to the operation, however, is highly active, muct more active than it is during the major part of the operation. This high initial activity and the subsequent decrease in activity of the adsorptive catalyst involves several difficulties. In particular, it makes it difficult to avoid over-treatment of the hydrocarbon vapors passed in contact with the adsorptive catalyst when fresh, with consequent losses, it makes it difficult to maintain uniform operating conditions and it makes it difficult to secure a uniform product.

The initial activity of the adsorptive catalyst induces over-treatment in at least two ways. The initial activity itself tends to cause over-treatment. In addition, the polymerization action is exothermic and as a consequence the tendency toward increase in the reaction rate involves a tendency toward temperature increase. This in turn tends to increase the rate at which the reaction proceeds. This tendency toward over-treatment has peculiar disadvantages in the treatment of motor fuel gasoline.

In the treatment of hydrocarbon vapors including gasoline components produced by vapor phase cracking, for example, the temperature increase on passage through a body of fresh fuller's earth may amount to as much as 100° F. or more, and this increase in temperature is usually accompanied by an increase in the color of the hydrocarbon vapors escaping from the fuller's earth treatment. In the case of hydrocarbon vapor mixtures which have been fractionated to some definite end boiling point, this end boiling point is usually substantially elevated. Apparently, these undesirable effects upon the character of the escaping product are due to vaporization of polymers formed by the action of the fuller's earth with consequent contamination of the escaping vapor mixture. Further over-treatment tends to cause losses in the separation and removal of constituents suitable and desirable as components of the motor fuel product.

This invention provides an improved apparatus which affords control of the refining operation by which these difficulties due to such initial activity of the adsorptive catalysts used in this type of refining operation may be obviated. In one aspect, the invention provides for improvement of the uniformity of the refining operation, and in this aspect the invention has several further advantages, including improved economy as to the adsorptive catalyst used.

In the operation of the apparatus of the present invention, the length of the path of the hydrocarbon vapors to be refined through the charge of the adsorptive catalyst with which they are passed in contact is regulated as the operation proceeds to compensate for changes in the activity of the adsorptive catalyst. During the period of initial high activity, the hydrocarbon vapors are passed through but a short path in contact with the adsorptive catalyst and as the activity of the catalyst decreases the length of the path is increased correspondingly. This is advantageously accomplished in accordance with this invention, by passing the hydrocarbon vapors to be refined through a charge of the adsorptive catalyst in a receptacle provided with a number of auxiliary vapor outlets spaced along the general path of vapor travel through the adsorptive catalyst. Thus, while the charge of the adsorptive catalyst within the receptacle is fresh and highly active, the hydrocarbon vapors are discharged through the auxiliary vapor outlet nearest the vapor inlet after passage in contact with the adsorptive catalyst over but a short path, and, as the activity of the adsorptive catalyst in contact with the hydrocarbon vapors decreases, the length of the path over which the hydrocarbon vapors are in contact with the adsorptive catalyst is increased by discharging the vapors through a vapor outlet spaced further from the vapor inlet, and then through a vapor outlet spaced still further from the vapor inlet, and so on, thus avoiding over-treatment of the hydrocarbon vapors and consequent losses. Excessive consumption of the adsorptive catalyst usually involved in such over-treatment due to the initial activity of the adsorptive catalyst when fresh is also avoided. A similar result may be accomplished by discharging the hydrocarbon vapors from the receptacle in which the refining operation is carried out at some fixed point and supplying the hydrocarbon vapors to the receptacle progressively at points more and more remotely spaced from the vapor outlet along the general path of vapor travel therethrough.

The invention will be further described in connection with the accompanying drawings which illustrate, diagrammatically and conventionally, in elevation and partly in section and with parts broken away, apparatus embodying the invention, but it is intended and will be understood that this more detailed description and illustration of the invention is by way of exemplification.

The apparatus illustrated comprises a vertically arranged tower 1 provided with a transverse foraminous partition 2 near its lower end, adapted to support a charge of the adsorptive catalyst but to permit fresh passage of vapors, and provided with suitable means, for example the manholes illustrated, to permit charging with and replacement of charges of the adsorptive catalyst used. The hydrocarbon vapors to be refined are supplied through connection 3 and the escaping hydrocarbon vapors are discharged through connection 4. In operation, the hydrocarbon vapors may be passed either upwardly or downwardly through the tower 1 or alternately upwardly and downwardly, and to permit such several operations the supply and discharge connections 3 and 4 are provided with branch connection controlled by suitable valves as shown. The invention will be described more particularly as carried out with downflow of vapors through the tower 1 as this is a particularly advantageous mode of operation. A series of auxiliary vapor outlets 5, 6 etc. are arranged at spaced intervals through the tower. Each of these auxiliary vapor outlets consists of an annulus 7 sloping downwardly and inwardly from the tower shell at an angle sufficient to prevent retention of the adsorptive catalyst, the space beneath this annulus communicating with the vapor discharge connection 4 through valve controlled connections, 8, 9 etc. The opening into the space beneath the annulus 7 is with advantage covered with a perforated plate or screen 10 adapted to permit free passage of vapors but to exclude the adsorptive catalyst. The area between the tower shell and the lower edge of the annulus should be proportioned and the perforated plate or screen should be of a character to involve a minimum pressure drop during vapor flow therethrough. Steam connections 11 are provided for purging the space beneath the annular members forming these auxiliary vapor outlets when the tower is to be opened. These steam connections are with advantage arranged tangentially with respect to the tower shell.

In the operation of the apparatus illustrated, with downflow of vapors through the charge of the adsorptive catalyst, the tower is filled, approximately, with the adsorptive catalyst, for example, fuller's earth of 40–60 or 60–80 mesh, and the hydrocarbon vapors to be refined are then introduced into the upper end of the tower through connections 3 and 12. As the operation is initiated, the vapors are discharged through connection 8 to connection 4 from the uppermost auxiliary vapor outlet 5 thus passing in contact with the adsorptive catalyst over but a short path. As the initial activity of the adsorptive catalyst along this short path falls off, connection 8 is closed and the vapors are discharged to connection 4 from the next lower auxiliary vapor outlet, and so on. The operation is continued with passage of the hydrocarbon vapors through the entire charge of the adsorptive catalyst until the catalyst is no longer useful for effecting the desired refining operation. The operation is then terminated, the charge of the adsorptive catalyst replaced with a fresh charge, and the refining operation resumed as described above. During the operation, the liquefied portions of the hydrocarbons introduced into the tower accumulate in the lower end of the tower and are discharged through connection 13. The discharge of this liquefied condensate may be regulated, for example, to maintain a definite liquid level in the lower end of the tower.

Where the operation is carried out with upflow of vapors through the charge of the adsorptive catalyst in the tower 1, it is advantageous to leave sufficient free space in the upper end of the tower above the charge of the catalyst to permit adequate separation of any entrained liquefied material, for example higher boiling polymers, from the escaping vapors.

In one aspect, the invention provides an improved means for controlling refining operations of this general type, in which portions of the charge of the adsorptive catalyst are discharged and replaced during the operation without interrupting the flow of the hydrocarbon vapors to be refined through the charge of the adsorptive catalyst, either during the initial period of such continuous operation or during the continued operation.

Activated carbon, silica gel, metallic gels and other similar adsorptive catalysts are also useful in carrying out the invention. Fuller's earth, however, is particularly advantageous for this purpose.

The invention is of special value and application in the refining in the vapor phase of cracked gasoline intended for use as motor fuel or hydrocarbon mixtures including such cracked gasoline components, particularly from vapor phase cracking operations, but the invention is also useful in other applications, to the treatment of other gasolines and to the treatment of other hydrocarbon oils.

I claim:

1. An apparatus for contacting hydrocarbon vapors with an adsorptive catalyst, comprising a receptacle, means for supporting a charge of the adsorptive catalyst therein so that said catalyst will extend above said auxiliary connections, means for supplying hydrocarbon vapors to an end only of the receptacle, means for discharging hydrocarbon vapors from the other end of the receptacle, a series of auxiliary vapor connections having valves therein arranged along the normal path of vapor travel through the adsorptive catalyst.

2. An apparatus for contacting hydrocarbon vapors with an adsorptive catalyst comprising a vertically arranged tower, means for supporting a charge of the adsorptive catalyst therein, a series of annular members sloping downwardly from said shell at spaced intervals within the region normally occupied by the charge of the adsorptive catalyst, auxiliary vapor connections having valves therein communicating with the space within the shell beneath said annular members, a vapor inlet to an end of said shell only, and a vapor outlet from the other end of said shell.

In testimony whereof, I have subscribed my name.

WILLIAM MENDIUS.